United States Patent [19]
Kikuchi et al.

[11] Patent Number: 5,927,323
[45] Date of Patent: Jul. 27, 1999

[54] PRESSURE CONTROL VALVE

[75] Inventors: Hideya Kikuchi; Etsuro Hozumi; Akinao Minegishi; Nobuo Aoki; Shigeru Kashiwaba; Fujio Aoki, all of Saitama-ken, Japan

[73] Assignee: Zexel Corporation, Tokyo, Japan

[21] Appl. No.: 09/064,088

[22] Filed: Apr. 22, 1998

[30]   Foreign Application Priority Data

Apr. 23, 1997 [JP] Japan .................................. 9-120229

[51] Int. Cl.$^6$ ........................... F16K 21/10; F16K 25/00; F16K 15/00
[52] U.S. Cl. ..................................... 137/514.5; 137/454.5; 137/549; 137/540
[58] Field of Search ............................... 137/454.4, 454.5, 137/514.5, 550, 549, 543.23, 540; 251/356

[56]   References Cited

U.S. PATENT DOCUMENTS

| | | | |
|---|---|---|---|
| 1,111,319 | 9/1914 | Paulsmeier | 137/514.5 |
| 1,466,171 | 8/1923 | Jacobsen | 137/514.5 |
| 2,197,455 | 4/1940 | Volpin | 137/514.5 |
| 2,411,930 | 12/1946 | Mathys | 137/514.5 |
| 2,600,875 | 6/1952 | Hrdlicka, Jr. | 137/514.5 |
| 2,927,605 | 3/1960 | Stephens | 137/543.23 |
| 4,051,864 | 10/1977 | Iwatsuki | 137/514.5 |
| 4,171,712 | 10/1979 | DeForrest | 137/513.5 |
| 4,391,295 | 7/1983 | Stipe | 137/514.5 |
| 5,050,636 | 9/1991 | Sagawa et al. | 137/514.5 |
| 5,558,068 | 9/1996 | Kunishima et al. | |

FOREIGN PATENT DOCUMENTS 181461   6/1964   U.S.S.R. .

*Primary Examiner*—Henry Bennett
*Assistant Examiner*—Joanne Y. Kim

[57]   ABSTRACT

An externally threaded portion 31 of a valve body 10 is threadingly engaged with an internally threaded portion Hb formed on the opening portion side of an attachment hole Ha. A flange portion 32 of the valve body 10 is brought into abutment with an upper surface Hc of the housing H, so that the valve body 10 is fixed to the housing H. A lower end of the valve body 10 is located away from a bottom surface of the attachment hole Ha. A valve seat 23 and a guide hole 24 are formed inside the valve body 10. The valve seat 23 and the guide hole 24 are located on a lower side than the externally threaded portion 31. A valve element 50 is provided inside the valve body 10. This valve element 50 includes a seat portion 51 rest on the valve seat 23, and a guide portion 55 slidably engageable with the guide hole 24. A lower end opening portion of the guide hole 24 is shielded with a shielding plate 25. An orifice 25a is formed in the shielding plate 25.

4 Claims, 4 Drawing Sheets

PRIOR ART

PRESSURE CONTROL VALVE

FIELD OF THE INVENTION

This invention relates to a pressure control valve used in a fuel injection apparatus.

BACKGROUND OF THE INVENTION

In general, as shown in FIG. 6, a fuel injection apparatus includes a field pump Fp for feeding a fuel contained in a fuel tank T to a high pressure pump Pp, the high pressure pump Pp for pressuring a fuel, a common rail R to which a high pressure fuel is supplied from the high pressure pump Pp, a pressure control valve V located between the common rail R and the fuel tank T, and a fuel injection nozzle I. The fuel pressure in the common rail R is controlled by the pressure control valve V so as not to exceed a predetermined level. The fuel in the common rail R is injected from the fuel injection nozzle I into a combustion chamber (not shown) of an engine.

A pressure control valve V of the type used in the fuel injection apparatus is disclosed in U.S. Pat. No. 5,558,068. This valve will be described with reference to FIG. 7.

The pressure control valve V includes a valve body fixedly inserted into an attachment hole Ha of a housing (attachment member) H of the common rail R. This valve body 1 comprises a seat member 2, and a plug member 3.

The seat member 2 is engaged fluid tight with a bottom portion side of the attachment hole Ha and abutted with a bottom surface of the attachment hole Ha through a gasket G. On the other hand, the plug member 3 is threadingly engaged with an upper end opening portion side of the attachment hole Ha. A lower end face of the plug member 3 is abutted against an upper end face of the seat member 2. Accordingly, when the plug member is tightened, the seat member 2 is urged against the bottom surface of the attachment hole Ha through the gasket G. By this, the seat member 2 and the plug member 3 are fixed to the housing H.

A vertical through-hole (guide hole) 2a is formed inside the seat member 2. This through-hole 2a is in communication with a fuel lead-in port P1 through a gap formed between an inner peripheral surface of the attachment hole Ha and an outer peripheral surface of the seat member 2. The fuel lead-in port P1 is connected to a fuel reservoir Ra inside the common rail R. A tapered valve seat 2c is formed on an upper end opening portion of the through-hole 2a.

A vertical through-hole 3a is formed inside the plug member 3. An upper end opening portion of this hole 3a is hermetically closed with a closure member 4. A lower end opening portion of the hole 3a is hermetically closed with the upper end face of the seat member 2. By this, A valve receiving chamber 5 is formed inside the hole 3a. This valve receiving chamber 5 is in communication with a fuel lead-out port P2 through a cross hole 3b and a gap formed between an inner peripheral surfaces of a cross hole 3b and the attachment hole Ha and an outer peripheral surface of the plug member 3. The fuel lead-out port P2 is connected to the fuel tank T.

A valve element 6 is vertically movably provided in the valve receiving chamber 5. This valve element 6 is formed with a valve portion 6a, a reduced diameter portion 6b, and a guide portion 6c in order from its upper end side towards its lower end side. The valve portion 6a is caused to sit on the valve seat 2c by a valve spring 7. The guide portion 6c is slidably engaged in the through-hole 2a. A damper chamber 8 filled with fuel is formed on a lower end portion of the through-hole 2a by the guide portion 6c and the bottom surface of the attachment hole Ha.

When the fuel pressure in the fuel reservoir Ra of the common rail R is equal to or less than a predetermined level in the pressure control valve V thus constructed, the valve element 6 is caused to sit on the valve seat 2c by the valve spring 7. Accordingly, no fuel in the common rail R returns to the fuel tank T. On the other hand, when the fuel pressure in the fuel reservoir Ra becomes higher than the prescribed level, the valve element 6 is lifted from the valve seat 2c against a biasing force of the valve spring 7. As a result, the fuel introduced into the attachment hole Ha from the fuel lead-in port P1 is returned from the fuel lead-out port P2 to the fuel tank T via the cross hole 2b, the through-hole 2a, the valve receiving chamber 5, and the cross hole 3b. By this, the fuel pressure in the fuel reservoir Ra is maintained equal to or less than the predetermined level.

When the valve element 6 makes a sitting movement and a lifting movement in the pressure control valve V, the guide portion 6c is guided by the through-hole 2a. Accordingly, the valve element 6 can smoothly move in a vertical direction. Moreover, when the valve element 6 moves, the fuel in the damper chamber 8 flows towards the cross hole 2b through a slide gap formed between the inner peripheral surface of the through-hole 2a and the outer peripheral surface of the guide portion 6c or the fuel in the cross hole 2b flows into the damper chamber 8. At that time, the slide gap acts as a sort of an orifice. Accordingly, the damper chamber 8 exhibits a damping function to prevent the valve element 6 from abruptly making a lifting movement and a sitting movement. By this, hunting of the valve element 6 is prevented.

Since the seat member 2 is urged against the bottom surface of the attachment hole Ha by the plug member 3 in the above-mentioned pressure control valve, the seat portion 2 is deformed and the valve seat 2c and the through-hole 2a are deformed. Deformation of the valve seat 2c degrades the hermetic closability between the valve portion 6a and the valve seat 2c. For this reason, there is such a fear that fuel leaks between the valve seat 2c and the valve portion 6a, and the fuel pressure in the common rail R cannot reach the predetermined level when the engine is rotating at a low speed.

When the through-hole 2a is deformed, the guide portion 6c becomes unable to move smoothly within the through-hole 2a and the smooth lifting and sitting movements of the valve element 6 with respect to the valve seat 2c are jeopardized. As a result, there is a fear that the pressure adjustment function to be exhibited by the pressure control valve V is adversely affected. Moreover, a desired damping effect to be exhibited by the damper chamber 8 cannot be obtained because when the through-hole 2a is deformed, the slide gap between through-hole 2a and the guide portion 6c greatly varies in largeness.

SUMMARY OF THE INVENTION

The present invention has been accomplished in order to solve the above problems, and the gist of the present invention resides in a pressure control valve comprising:

a valve body including a fluid flow passage formed inside thereof, and a valve seat for dividing the passage into an upstream side and an downstream side, the valve body being inserted into an attachment hole of an attachment member and fixed to the attachment member by fixing means;

a valve element provided inside the valve body and capable of closing the passage when the valve element sits on the valve seat, and opening the passage when the valve element lifts from the valve seat;

a guide hole, which extends from the valve seat side to one end face of the valve body, being formed inside the valve body at an area nearer to one end of the valve body than from the valve seat;

a guide portion slidably engageable with the guide hole being formed in the valve element;

the fixing means being located on the other end side of the valve body from the valve seat, so that a fixing force for the fixing means to fix the valve body to a housing will act only on the other end side of the valve body from the valve seat and the guide hole;

one end portion of the valve body being away from a bottom surface of the attachment hole;

a shield member for hermetically closing the guide hole being provided on the one end portion of the valve body; and a damper chamber being formed inside the guide hole between the guide portion and the shield member.

It is preferred that the valve body is inserted into the attachment hole of the attachment member first with the one end portion of the valve body, and the fixing means includes screw means comprised of an internally threaded portion and an externally threaded portion, and one pair of abutment portions to be abutted with each other when the screw means is tightened, the internally thread portion and the externally threaded portion being formed respectively on the other end side of the valve body and the attachment member, the one pair of abutment portions being likewise formed respectively on the other end side of the valve body and the attachment member.

It is preferred that the valve body includes a plug member inserted into the attachment hole from its opening portion side and fixed to the attachment member by the fixing means, and a seat member inserted into a bottom portion side of the attachment hole and formed inside thereof with the valve seat and the guide hole, and the plug portion and the sheet member are integrally fixedly connected together.

It is preferred that the shield member is formed therein with an orifice extending all the way therethrough.

It is also preferred that the valve seat exhibits a tapered configuration, the valve element includes a first tapered portion having a smaller taper angle than the valve seat, and a second tapered portion having a larger taper angle than the valve seat, and a seat portion to be rest on an intermediate portion of the valve seat is formed on an intersecting portion between the first and second tapered portions.

DETAILED DESCRIPTION OF THE INVENTION

Several embodiments of the present invention will be described hereinafter with reference to FIGS. 1 to 5.

Figure 1:
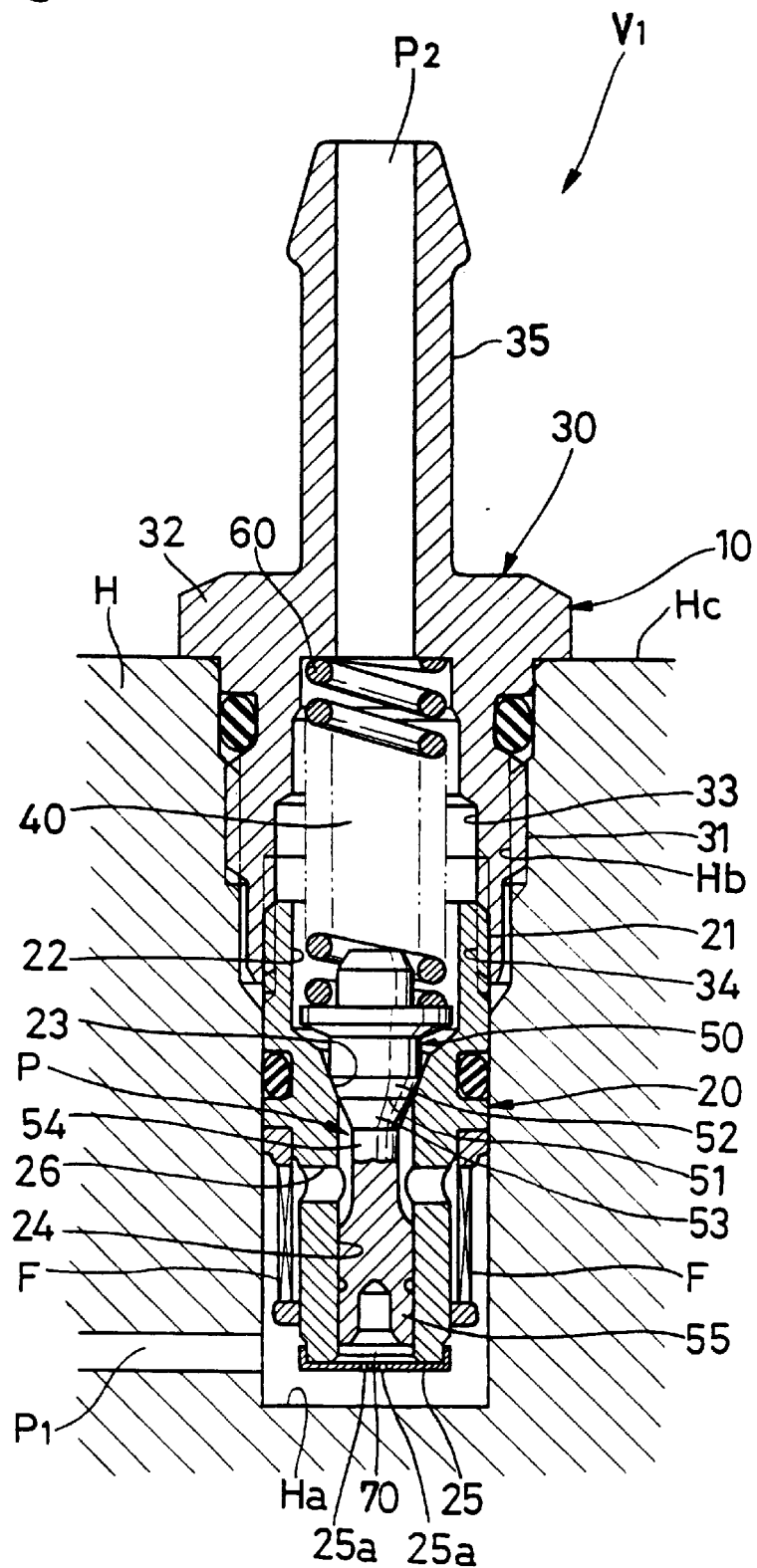
FIG. 1 is a sectional view showing the first embodiment of the present invention.
Figure 2:
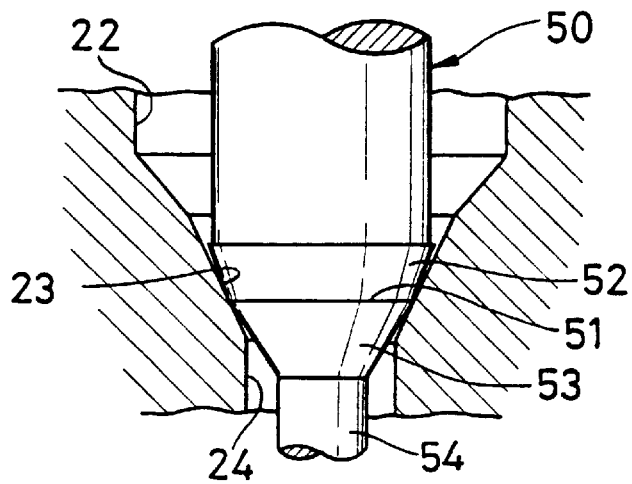
FIG. 2 is an enlarged sectional view showing a valve seat, and its nearby area, in the first embodiment of FIG. 1.
Figure 3:
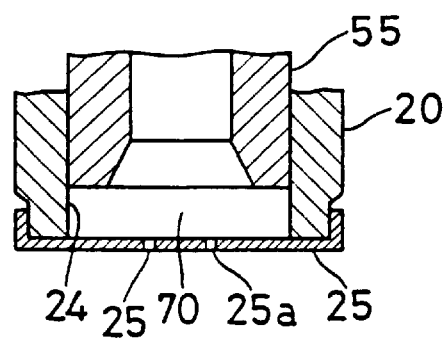
FIG. 3 is an enlarged sectional view showing a lower end portion of a seat member in the first embodiment of FIG. 1.
Figure 6:
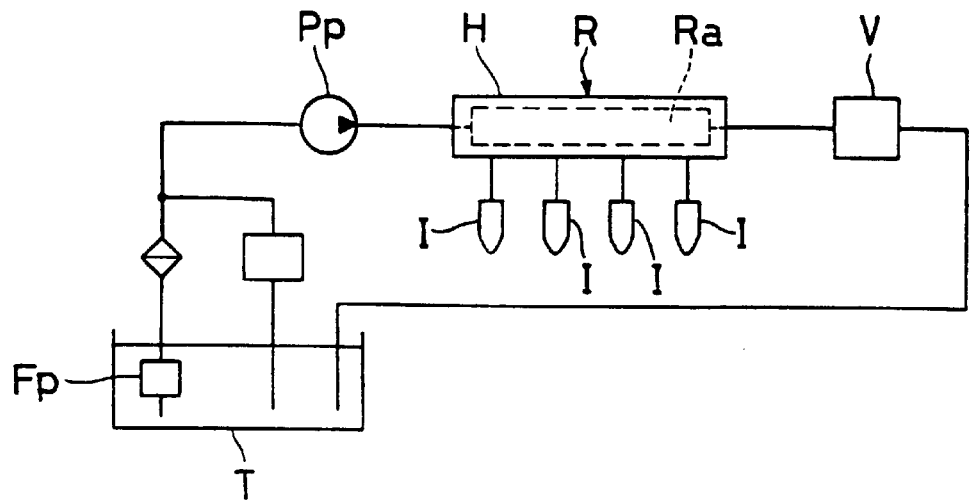
FIG. 6 is a schematic diagram showing one example of a fuel injection apparatus.
Figure 7:
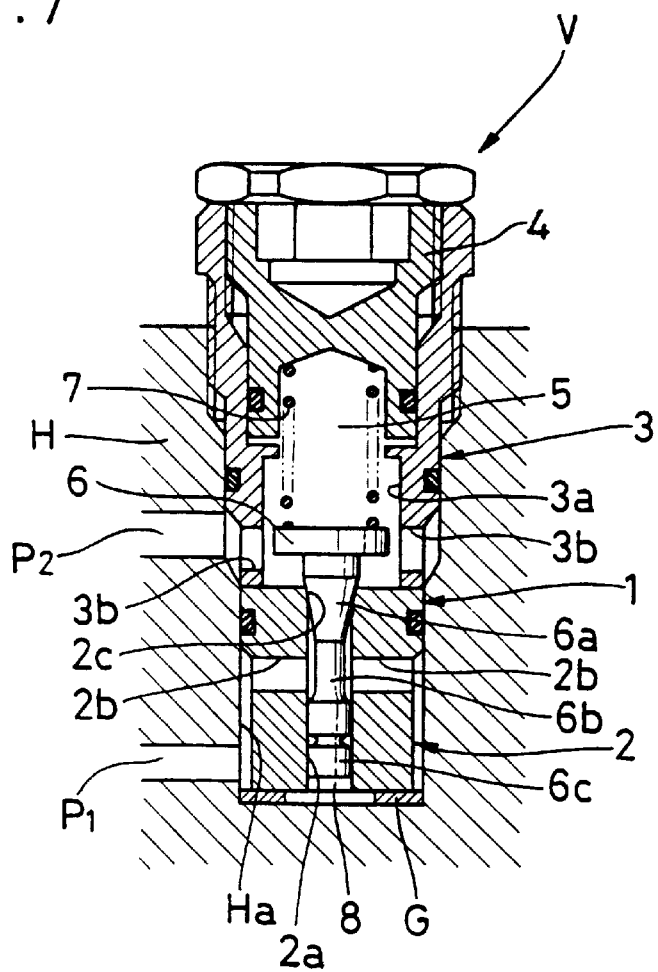
FIG. 7 is a sectional view showing one example of the conventional pressure control valve.

Referring first to FIGS. 1 to 3, the first embodiment of the present invention will be described. A pressure control valve V1 in this embodiment includes a valve body 10. This valve body 10 is fixedly inserted into an attachment hole Ha of a housing (attachment member) of a common rail R (see FIG. 6). The valve body 10 may be attached to an attachment block (attachment member) of a pressure control valve V1 itself, or it may be attached to other member, such as, an engine block, or the like.

The valve body 10 comprises a seat member 20 engaged fluid tight with a bottom portion side of the attachment hole Ha, and a plug member 30 engaged fluid tight with the opening portion side of the attachment hole Ha. An externally threaded portion 21 is formed on an outer peripheral surface of an upper end portion of the seat member 20. The plug member 30 is formed with a receiving hole 33 extending upwardly from its lower end face. An internally threaded portion 34 is formed on a lower end portion of an inner peripheral surface of this receiving hole 33. The seat member 20 and the plug member 30 are integrally fixedly connected together by depressing the outer peripheral surface of the lower end portion of the plug member 30 such that the diameter of the plug member is reduced after bringing the internally threaded portion 34 and the externally threaded portion 35 into engagement with each other over an appropriate length.

An externally threaded portion 31 is formed on a lower end side of an outer peripheral surface of the plug member 30, and a flange portion 32 is formed on a rather upper side thereof. The plug member 30 is fixed to the housing H by urging the flange portion 32 against an upper surface Hc of the housing H with the externally threaded portion 31 threadingly engaged with the internally threaded portion Hb formed in the attachment hole Ha. In this embodiment, the externally threaded portion 31 and the internally threaded portion Hb constitute a screw means of the fixing means, and the flange portion 32 and the upper surface Hc of the housing H constitute an abutment portion of the fixing means.

Since the plug member 30 is fixed to the housing H and the seat member 20 is fixed connected to the plug member 30, the seat member 20 is not required to be urged against the bottom surface of the attachment hole Ha. The lower end portion of the seat member 20 is located away slightly upwardly from the bottom surface of the attachment hole Ha.

The seat member 20 is fixed to the lower end portion of the receiving hole 33. As a result, a valve receiving chamber 40 is defined within the receiving hole 33. This valve receiving chamber 40 is in communication with a fuel tank (not shown) through a fuel lead-out port P2 of a joint portion 35 formed on an upper end face of the plug member 30.

Within the seat member 20, there are formed an enlarged diameter hole 22 extending downwardly from its upper end face, a downwardly tapered valve seat 23 located next to said enlarged diameter hole 22, and a guide hole 24 extending from the valve seat 23 to its lower end face. A lower end opening portion of the guide hole 24 is hermetically closed by a shielding plate (shield member) 25 fixed to the lower end portion of the seat member 20 by welding, or the like.

A cross hole 26 extending to the guide hole 24 is formed in the outer peripheral surface of the seat member 20. This cross hole 26 is in communication with a fuel lead-in port P1 through a gap formed between the inner peripheral surface of the attachment hole Ha and the outer peripheral surface of the seat member 20. Accordingly, the guide hole 24 is in communication with the fuel lead-in port P1. The fuel lead-in port P1 is connected to a common rail R of the fuel injection apparatus. The fuel lead-in port P1 is, in some cases, connected to a high pressure pump Pp )see FIG. 6).

Reference character F denotes a filter for preventing entry of a foreign matter from the cross hole 26 into the pressure control valve V1.

A valve element 50 is vertically movably receiving in the valve receiving chamber 40. A seat portion 51 to be rest on the valve seat 23 is formed on an outer peripheral surface of an intermediate portion of the valve element 50. As shown in FIG. 2, this seat portion 51 is formed on an intersecting portion between an upper first tapered portion 52 having a slightly smaller (on the order of 0.5 degrees to 1 degrees) taper angle than the valve seat 23 and a lower second tapered potion 53 having a slightly larger (on the order of 0.5 degrees to 1 degrees) taper angle than the valve seat 23. The seat portion 51 is formed on the intersecting portion between the first tapered portion 52 and the second tapered portion 53 because the hermetic closability between the seat portion 51 and the valve seat 23 can be enhanced.

A valve spring 60 is located in the valve receiving chamber 40. This valve spring 60 biases the valve element 50 downwardly to cause the seat portion 51 to rest on the valve seat. Upon resting of the seat portion 51 on the valve seat 23, the communication between the guide hole 24 and the valve receiving chamber 40 is cut off, and therefore, the communication between the common rail R and the fuel tank T is cut off. When the seat portion 51 lifts from the valve seat 23, the communication between the guide hole 24 and the valve receiving chamber 40 is resumed and the high pressure fuel flowed into the guide hole 24 through the cross hole 26 is flowed into the valve receiving chamber 40 and then returned to the fuel tank T through the fuel lead-out port P2. A fuel passage P is constituted by the cross hole 26, a part of the guide hole 24, the valve receiving chamber 40, and the fuel lead-out port P2.

On the valve element 50, there are formed a reduced diameter portion 54 next to the second tapered portion 53, and a guide portion 55 in order downwardly. The reduced diameter portion 54 is smaller in diameter than the guide hole 24. Accordingly, fuel flows through a gap formed between the outer peripheral surface of the reduced diameter portion 54 and the inner peripheral surface of the guide hole 24. The guide potion 55 is generally the same in diameter as the guide hole 24 and is slidably engaged with the guide hole 24 located on a lower side than the cross hole 26. The guide portion 55 is slidably engaged with the guide hole 24 thereby to define a damper chamber 70 within the guide hole 24 between the guide portion 55 and the shielding plate 25.

As shown in FIG. 3, at least one orifice 25a is formed in the shielding plate 25. This orifice 25a communicates the damper chamber 70 with the fuel lead-in port P1 through the attachment hole Ha. Accordingly, when the valve element 50 makes a sitting movement, the fuel in the damper chamber 70 is pushed into the fuel lead-in port P1, and when the valve element 50 makes a lifting movement, the fuel in the fuel lead-in port P1 is introduced into the damper chamber 70.

In the pressure control valve V1 thus constructed, since the fixing means comprising the externally threaded portion 31 and the internally threaded portion Hb, and the flange portion (abutment portion) 32 to be abutted against the upper surface Hc are provided on the upper side than the seat member 20, the force fixing the valve body 10 to the attachment hole Ha of the housing H never acts on the seat member 20. Accordingly, the valve seat 23 and the guide hole 24 are hardly subjected to deformation. When the seat portion 51 of the valve element 50 rests on the valve seat 23, a favorable hermetic closability is maintained therebetween. Thus, fuel can be prevented from leaking between the seat portion 51 and the valve seat 23.

Since the guide hole 24 is not subjected to deformation, the guide portion 55 can smoothly slide within the guide hole 24 and the valve element 50 can make smooth sitting and lifting movements. Accordingly, a smooth operation of the pressure control valve V1 cannot be obtained.

Moreover, the slide gap between the guide hole 24 and the guide portion 55 can be maintained in a predetermined largeness, and a predetermined amount of resistance can be obtained as a flow resistance occurrable when fuel flows the slide gap. Particularly, in this embodiment, since the damper chamber 70 and the fuel lead-in port P1 are communicated with each other through the orifice 25a, there is no need to function the slide gap between the guide hole 24 and the guide portion 55 as an orifice. Accordingly, the slide gap between the guide hole 24 and the guide portion 55 can be reduced to a least possible size required for moving the guide portion 55. Thus, the valve element 50 can be moved more smoothly.

Other embodiments of the present invention will now be described. In the embodiments to be described hereinafter, only those parts of the construction different from the above embodiment will be described, similar parts are denoted by identical reference numerals, and description thereof are omitted.

Figure 4:
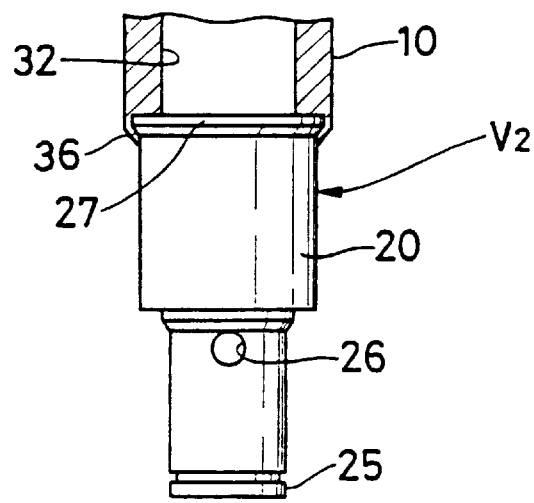
FIG. 4 is a side view, partly omitted, showing the second embodiment of the present invention.

In a pressure control valve V2 shown in FIG. 4, an annular projection 27 is formed on an outer peripheral surface of the upper end of the seat member 20. An annular claw portion 36 is formed on a lower end portion of the plug member 30. The seat member 20 and the plug member 30 are integrally fixed together by tightening the claw portion 36 after the annular projection 27 is engaged with the claw portion 36.

Figure 5:
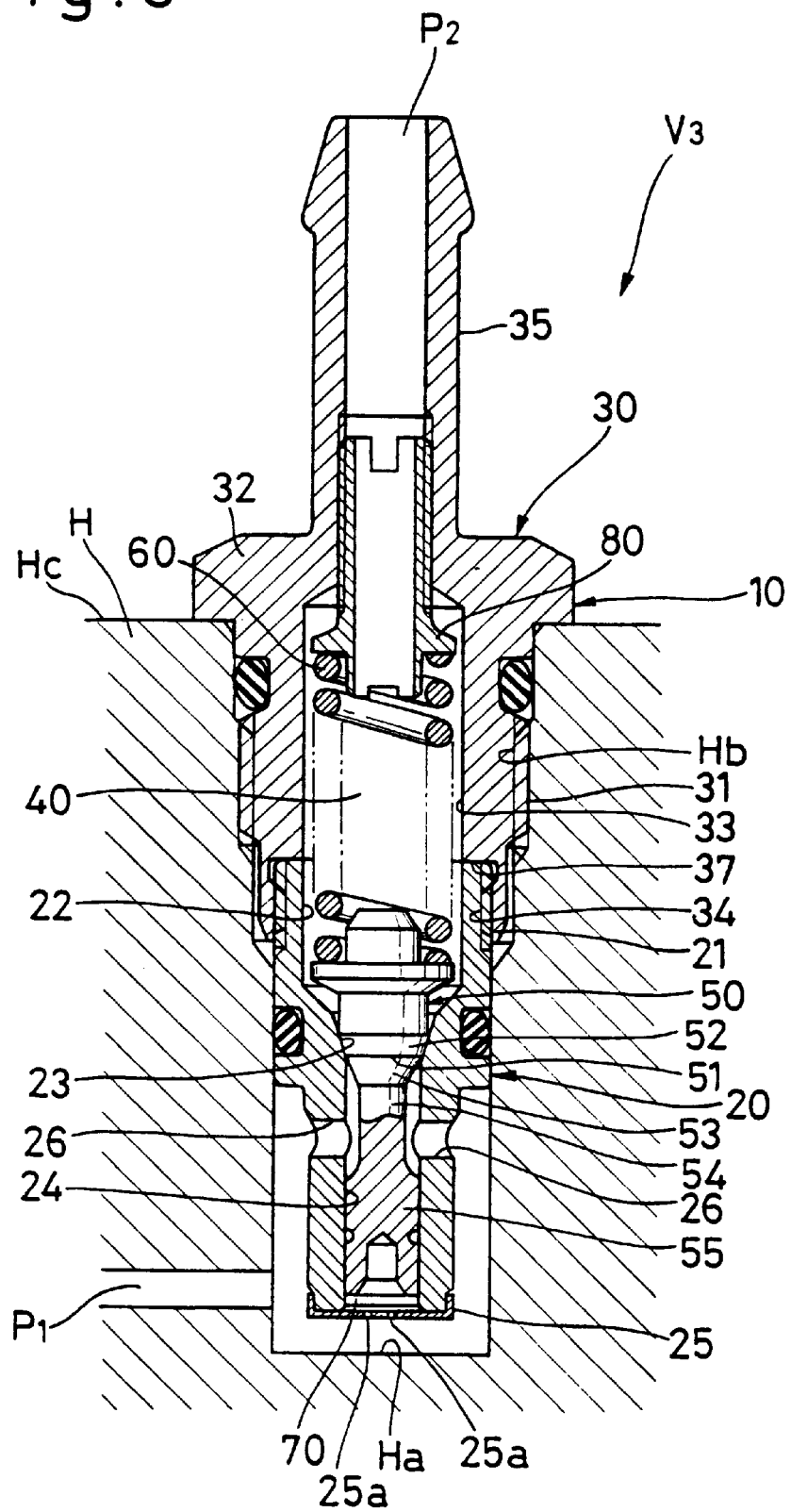
FIG. 5 is a sectional view showing the third embodiment of the present invention.

In a pressure control valve V3 shown in FIG. 5, the externally threaded portion 21 of the seat member 20 is threadingly engaged with the internally threaded portion 34 of the plug member 30, and the upper end face of the seat member 20 is brought into abutment with the abutment surface 37 of the plug member 30, so that the seat member 20 and the plug member 30 are fixedly connected together. An adjustment member 80 is threadingly engaged with an inner peripheral surface of the fuel lead-out port P2. A valve spring 60 is provided between the adjustment member 80 and the valve element 50. Accordingly, by adjusting the screwing amount of the adjustment member 60, the biasing force of the valve spring 60 with respect to the valve element 50 can be adjusted.

It should be noted that the present invention should not be limited to the above embodiments. Instead, many changes and modifications can be made in accordance with necessity without departing from the scope of the present invention.

For example, in the above embodiments, the lower end of the guide hole 24 is open and the opening portion is closed with the shielding plate 25. In the alternative, the lower end portion of the guide hole 24 may be a blind hole. In doing so, of course, the orifice 25a is formed directly in the seat member 20. In case the orifice 25a is formed in the shielding plate 25, the orifice 25a can easily be formed by laser treatment, or the like. Moreover, only if several kinds of shielding plates 25 each having an orifice(s) of a difference diameter and different numbers are prepared, the damping function by the damper chamber 70 can be uniformed in the respective pressure control valves by properly selected one of the shielding plates 25. Accordingly, the orifice 25a is preferably formed in the shielding plate 25.

Although the guide hole is formed into a straight hole having a uniform inside diameter, the upper part of the guide hole 24 from the cross hole 26 may be larger in diameter than the lower part from the guide hole 24 because the guide portion 55 never slides on the upper part.

What is claimed is:

1. A pressure control valve comprising:

a valve body including a fluid flow passage formed inside thereof, and a valve seat for dividing said passage into an upstream side and an downstream side, said valve body being inserted into an attachment hole of an attachment member and fixed to said attachment member by fixing means;

a valve element provided inside said valve body and capable of closing said passage when said valve element sits on said valve seat, and opening said passage when said valve element lifts from said valve seat;

a guide hole, which extends from said valve seat side to one end face of said valve body, being formed inside said valve body at an area nearer to one end of said valve body than from said valve seat;

a guide portion slidably engageable with said guide hole being formed in said valve element;

said fixing means being located on the other end side of said valve body from said valve seat, so that a fixing force for said fixing means to fix said valve body to a housing will act only on the other end side of said valve body from said valve seat and said guide hole;

one end portion of said valve body being away from a bottom surface of said attachment hole;

a shield member for hermetically closing said guide hole being provided on said one end portion of said valve body; and a damper chamber being formed inside said guide hole between said guide portion and said shield member;

wherein said valve seat exhibits a tapered configuration, said valve element includes a first tapered portion having a smaller taper angle than said valve seat, and a second tapered portion having a larger taper angle than said valve seat, and a seat portion to be rest on an intermediate portion of said valve seat is formed on an intersecting portion between said first and second tapered portions.

2. A pressure control valve according to claim 1, wherein said valve body is inserted into said attachment hole of said attachment member first with said one end portion of said valve body, and said fixing means includes screw means comprised of an internally threaded portion and an externally threaded portion, and one pair of abutment portions to be abutted with each other when said screw means is tightened, said internally thread portion and said externally threaded portion being formed respectively on the other end side of said valve body and said attachment member, said one pair of abutment portions being likewise formed respectively on the other end side of said valve body and said attachment member.

3. A pressure control valve according to claim 1, wherein said valve body includes a plug member inserted into said attachment hole from its opening portion side and fixed to said attachment member by said fixing means, and a seat member inserted into a bottom portion side of said attachment hole and formed inside thereof with said valve seat and said guide hole, and said plug portion and said sheet member are integrally fixedly connected together.

4. A pressure control valve according to claim 1, wherein said shield member is formed therein with an orifice extending all the way therethrough.

* * * * *